United States Patent [19]

Hünninghaus

[11] Patent Number: 4,925,035
[45] Date of Patent: May 15, 1990

[54] PACKAGING FOR FOOD AND METHOD OF PRODUCING SAME

[75] Inventor: Werner Hünninghaus, Cologne, Fed. Rep. of Germany

[73] Assignee: Ludwig Schokolade GmbH, Aachen, Fed. Rep. of Germany

[21] Appl. No.: 244,141

[22] Filed: Sep. 14, 1988

[30] Foreign Application Priority Data

Sep. 17, 1987 [DE] Fed. Rep. of Germany ....... 3731277

[51] Int. Cl.$^5$ ............................................ B65D 51/20
[52] U.S. Cl. .................................. 206/633; 206/631; 229/125.35; 229/160; 229/162; 229/906; 229/40
[58] Field of Search ................ 229/9, 19, 40, 125.35, 229/160, 161, 160.2, 162, 902, 906; 206/631, 633, 611

[56] References Cited

U.S. PATENT DOCUMENTS

| 3,286,909 | 11/1966 | Scharre | 229/40 |
| 3,349,985 | 10/1967 | Salway | 206/633 |
| 3,604,560 | 9/1971 | Farquhar | 229/40 |
| 3,618,848 | 11/1971 | Pawlowski | 229/40 |
| 3,672,916 | 6/1972 | Virnig | 229/160.2 |
| 3,868,017 | 2/1975 | Carveth | 229/40 |
| 3,899,079 | 8/1975 | Seiter | 206/611 |
| 4,013,798 | 3/1977 | Goltsos | 229/9 |
| 4,511,042 | 4/1985 | Wischusen, III | 229/19 |
| 4,674,633 | 6/1987 | Steadman | 229/40 |
| 4,821,884 | 4/1989 | Griffen et al. | 229/40 |

FOREIGN PATENT DOCUMENTS 1174547 3/1959 France ............................. 229/40

Primary Examiner—Gary Elkins
Attorney, Agent, or Firm—Robert W. Becker & Associates

[57] ABSTRACT

A packaging for food such as individual pieces of chocolate or candy. The packaging has an inner package with a sealing foil that seals off a product holder. An outer package that surrounds the inner package is made of stiffening material and is provided with a flange that extends parallel to the sealing foil, so that at least the rim portion of the product holder and of the sealing foil extend below the flange. A connecting seam is disposed between the sealing foil and the product holder at a distance from the outer edge of the rim portion of the product holder.

24 Claims, 2 Drawing Sheets

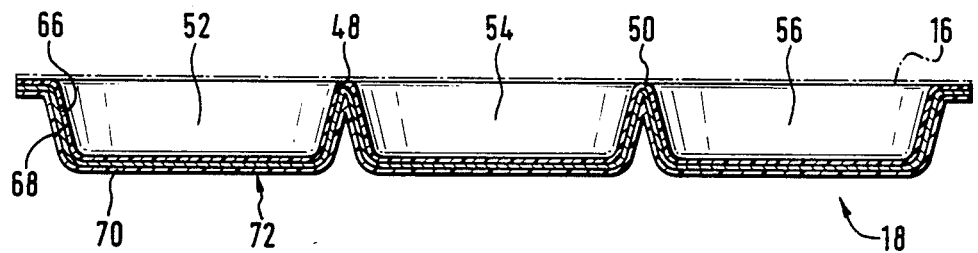
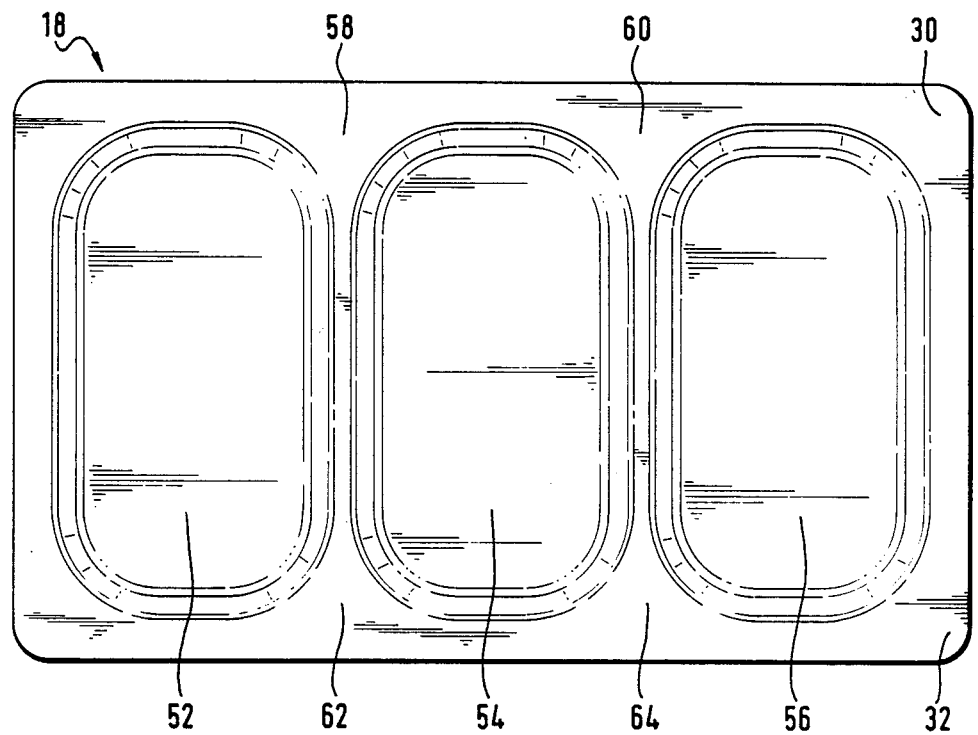

PACKAGING FOR FOOD AND METHOD OF PRODUCING SAME

BACKGROUND OF THE INVENTION

The present invention relates to a packaging for food, especially food such as individual pieces of chocolate or candy that keep for only a limited time. The packaging comprises an inner package, which includes a product holder sealed by a foil, and an outer package that surrounds the inner package and is made of a stiffening material such as cardboard. The present invention also relates to a method of producing a packaging having a product holder that includes a composite foil, one layer of which is made of plastic.

It is known with a packaging that comprises an outer package of stiff material, such as cardboard or the like, to provide an inner package that is completely surrounded by the outer package. Such a packaging has the advantage that the inner package can be sealed in an airtight manner, which is necessary for maintaining the freshness and flavor of the packaged goods. To optimize the use of the material, one started making the outer package of relatively rigid material and the inner package of a yielding, elastically tough material, such as foil, so that the inner package has an extremely low permeability to vapor.

In this connection, the heretofore known inner package is embodied in such a way that a product holder is provided, the top of which is sealed with a foil, whereby either heat sealing or adhesion of the foil to the product holder is utilized.

Unfortunately, with this type of inner package difficulties arise if the foil is to be rapidly removed in order to quickly gain access to the goods. On the one hand, a flavor-tight seal must also be achieved in the region of the connection, since otherwise the flavor or aroma that is to be sealed-in would escape at this location. On the other hand, this connection must be maintained for a long period of time, since the storage time for the packaged goods could be several months.

Furthermore, the connection must also be able to cope with mechanical stresses. This is because it has been shown that with the usual rough handling of chocolate packages or the like, the connection seam, despite the use of an outer package, can split open if the inner package is securely glued to the bottom of the outer package, and the outer package is severely deformed, so that the goods press upon the foil.

For this reason, a packaging having an inner package and an outer package is known where the inner package is provided with a heat-sealed foil.

In order to be able to provide a secure fastening of the foil upon the product holder, the edge of the product holder provided for the heat sealing has a width of several millimeters.

In contrast, it is an object of the present invention to provide a packaging that can be economically and easily produced, yet can be sealed for a long period of time in a flavor or aromatight manner, with the packaging being adapted to be easily torn open in an aesthetically pleasing manner.

BRIEF DESCRIPTION OF THE DRAWINGS

This object, and other objects and advantages of the present invention, will appear more clearly from the following specification in conjunction with the accompanying schematic drawings, in which:

FIG. 3 is a schematic side view of another exemplary embodiment of the inventive product holder; and FIG. 4 is a plan view of the product holder of FIG. 3.

SUMMARY OF THE INVENTION

Figure 1:
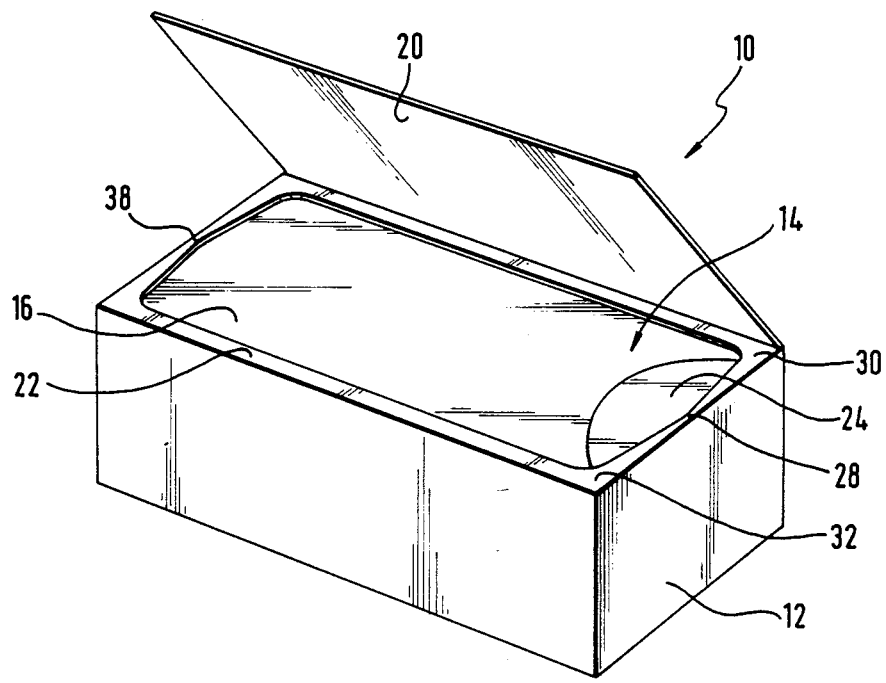
FIG. 1 is a perspective view of one exemplary embodiment of the inventive packaging, with the outer package being illustrated with the lid folded up.

The packaging of the present invention is characterized primarily in that the outer package is provided, remote from the bottom thereof, with an inwardly directed flange that extends parallel to the sealing foil, whereby below the flange are disposed at least a rim portion of the product holder and an edge of the sealing foil, with a connecting seam being disposed between the sealing foil and the product holder at a distance from an outer edge of the rim portion of the product holder.

By disposing the flange parallel to the sealing foil and above the latter, the inner package can be supported right at its connecting seam against the outer package. As a result, just when the goods are pressed against the sealing foil during transport, an increased counterpressure of the outer package is exerted upon the connecting seam, so that the danger that the sealing foil will tear open is reduced. Already due to this, the connecting seam can be made relatively weak. Surprisingly, the impact resistance of the inventive packaging is greater than where the outer package has a complete surface.

In addition, the sealing foil can have a visually pleasing appearance, in which case the surface of the packaging can so to speak entertain the observer.

By disposing the connecting seam between the sealing foil and the product holder toward the inside, a number of advantages are achieved. For one thing, the maximum load of the connecting seam when the packaging is crushed and distorted is increased. The shearing stress of the connecting seam when the outer package is damaged is less, because the force introduced is better distributed by the product holder edge that extends to the outside from the connecting seam.

Furthermore, in order to open the packaging, the sealing foil can be easily withdrawn without leaving any residue, in other words, without any pieces of foil remaining attached. The edge of the sealing foil that is beyond the connection stabilizes the foil, so that already from the beginning the foil is less likely to tear. In addition, the direction of pull is reversed in such a way that even when the packaging is rapidly torn open, the greatest portion of the applied force is introduced as a pulling force into the connecting seam, but not as a shearing force into the sealing foil. This is achieved because due to the outer package edge that extends above the connecting seam, the sealing foil forces during tearing-open are deflected and the torn-open and folded-over portion of the closure foil is supported on the inner surface of the edge of the outer package.

Furthermore, the freely supported edge of the sealing foil also acts as a resilient support between the rim portion of the product holder and the flange of the outer package.

It is particularly advantageous for the inventive effect that is to be achieved if the connecting seam is disposed inside the free edge of the flange of the outer package, since then quite a bit of foil material is available beyond the seam.

Beyond the connecting seam, the sealing foil can extend at least partially about an edge of the packaging, in which connection it is particularly expedient if a part of the wrapped-around foil is used as a pull tab. In the closed state, this tab can be partially covered by the flange, although only to such an extent that an adequate length of the tab is available to be gripped. In order to make it easier to grasp the tab and to prevent the sealing foil from tearing already in the region of the tab, the width of the tab in the region of the connecting seam corresponds to the width of the sealing foil, and the free end of the tab extends out conically.

In order to obtain a packaging that on the one hand is aromatight and on the other hand is easy to break open, it is particularly expedient to use for the product holder a heat-sealable foil. In contrast to the sealing foil, this foil is advantageously a composite foil that pursuant to tho present invention is deep drawn. Surprisingly, pursuant to the inventive method, deep-drawn product holders can be produced of such a depth that they are even adequate for such goods as individual pieces of chocolate, candy, or the like. It is possible with the present invention to achieve a drawn depth of 18 mm. For this purpose, a composite foil having an aluminum core is coated with plastic or is lacquered on both sides.

Specific features of the present invention will be described in detail subsequently.

DESCRIPTION OF PREFERRED EMBODIMENTS

Referring now to the drawings in detail, the packaging 10 of FIG. 1 comprises an outer package 12 and an inner package 14. The outer package 12 is made of cardboard or a similar stiff material. The inner package 14 comprises a wrapping or sealing foil 16 and a holder 18 for the goods or product; this can be seen more clearly in FIG. 2. The product holder 18 is also made of a foil, as will be described in detail subsequently.

In the embodiment illustrated in FIG. 1, the outer package 12 is provided with a hinged lid 20 that is integrally formed on the outer package 12 by being hinged in a known manner to an upper longitudinal edge of the package via the formation of a hinge groove.

During manufacture, the outer package 12 is formed from a packaging blank. The finished inner package 14 is introduced via non-illustrated folding walls, either at the bottom or at the end faces, with closure being effected via known insertion tabs, so that the outer package 12 has a construction that corresponds to the parallelepipedal construction of a cardboard box.

Pursuant to the present invention there is provided on the upper end of the outer package 12 a flange 22 that extends at least along the upper longitudinal edges of the outer package 12, and in the illustrated embodiment extends all the way around. Along the longitudinal edges, the flange 22 has a constant width of, for example, approximately one tenth of the width of the package. Along the upper end edges of the outer package 12 the flange 22 is tapered toward the middle of the ends.

As a release "handle", the sealing foil 16 is provided with a folded-over tab 24 that serves for tearing open the packaging or for removing the foil 16 from the product holder 18. The tab 24 is tapered toward the middle of the packaging and is disposed flat upon the sealing foil 16.

In order to tear the packaging 10 open, the tab 24 is pulled upwardly at an angle to the left in the view of FIG. 1. The tearing-open of a connecting seam 26 (see FIG. 2) between the product holder 18 and the sealing foil 16 begins at the narrow point 28 of the flange 22 approximately in the center of the upper end edge of the product holder 18. The width of the flange 22, which increases gradually starting from the narrow point 28, permits a smooth transition of the strength or counteracting force with which the connecting seam 26 counteracts the opening due to the angle of application of force; this transition of strength extends to the corner regions 30 and 32, in which the flange 22 is rounded off via a small radius, so that the strength or counteracting force is not abruptly reduced.

Stated in another way, since the width of the flange 22 increases gradually in the end regions starting from the narrow points 28, 38, a plan view of the packaging 10 would show that the connecting seam 26 has an essentially hexagonal configuration rather than a rectangular configuration. In other words, in the end regions the connecting seam 26 extends at a slight angle. When the tab 24 is pulled upwardly at an angle to the left in FIG. 1, the tearing-open of the connecting seam 26 begins at the narrow point 28. If the connecting seam 26, in contrast to the inventive configuration, were to extend completely linearly from the narrow point 28 and between the corner regions 30 and 32, the movement of resistance of the entire length of the connecting seam 26 between these two corner regions 30 and 32 would have to be overcome all at once, making it very easy to tear the sealing foil 16. In contrast, due to the inventive angular course of the connecting seam 26 from the narrow point 28 to the corner regions 30 and 32, the connecting seam 26 is first torn open at the narrow point 28, which is the area of greatest resistance, and is then torn symmetrically open, relative to the narrow point 28, in a direction toward said corner regions 30 and 32 The resistance or counteracting force of the connecting seam 26 to the opening then decreases further, with the connecting seam 26 then being pulled open, starting at the corner regions 30 and 32, in its longitudinal direction, in contrast to its previously inclined direction of being pulled open.

Since when the sealing foil 16 is removed from the product holder 18 along the longitudinal sides, the connecting seam 26 is stressed by a combination of shearing forces and transverse forces, a smooth removal is possible. Surprisingly, the stressing of the connecting seam 26 with shearing forces when the packaging is being torn open is sufficient to reduce the danger of tearing the sealing foil 16.

The fact that stressing with shearing forces is favorable in this situation is also surprising because connecting seams generally provide greater resistance to shearing forces than to transverse forces in the direction that is most favorable for the tearing-open process.

Figure 2:
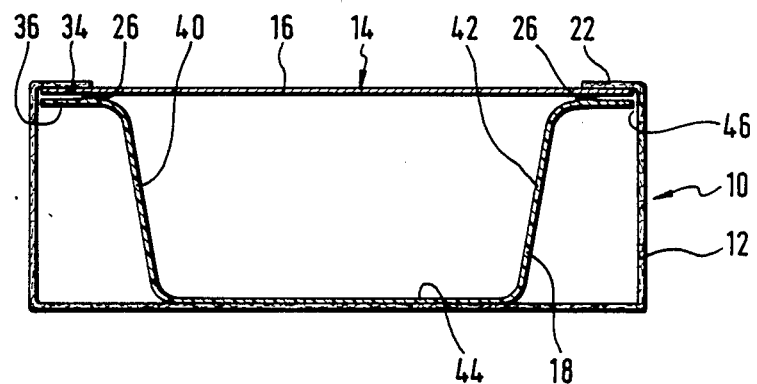
FIG. 2 is a cross-sectional view of the packaging of FIG. 1 without a lid.

Pursuant to the present invention, the foil is stabilized by providing externally of the connecting seam 26 a Circumferential, free foil edge 34, as can be seen in FIG. 2.

When the packaging 10 is torn open, the free edge 34 of the sealing foil 16 slides between a free outer edge of a rim portion 36 of the product holder 18 (see again FIG. 2) and the flange 22, sliding inwardly and laterally out of position, thereby at the same time forming a guide means for the subsequently torn open regions of the sealing foil. In addition, when the packaging 10 is torn open, the sealing foil 16 is turned up, so that the flange 22, also due to the introduced forces, is pressed up somewhat, facilitating withdrawal of the edge 34 of the sealing foil 16.

Disposed across from the narrow point 28 in the flange 22 is a further narrow point 38; this is also done for aesthetic reasons.

In addition, by providing the further narrow point 38 the possibility is given of also providing, if desired, the tab 24 at the narrow point 38, which would be particularly convenient for a right-handed person.

It would also be possible to provide two tabs, one at each of the narrow points 28 and 38.

FIG. 2 shows in detail the construction of the inner package 14. The sealing foil 16 is tightly connected to the product holder 18 via a circumferential connecting seam 26. Pursuant to one advantageous specific embodiment of the present invention, the connecting seam 26 is produced by a heat-sealing process, with the product holder 18 comprising a composite foil that permits heat sealing. Provided within the product holder 18 are two-layer separating inserts for chocolates. The product holder 18 has end walls 40 and 42 that at the bottom extend toward one another in a slightly conical manner, approximately at an angle of 10°. In so doing, on the one hand the stability or rigidity of the packaging is increased, and on the other hand removal of the contents is facilitated. In addition, the product holder 18 is provided all the way around with rounded corners, in other words, not only in the corner regions 30 and 32, but also in the direction toward the bottom 44, in order to reduce the danger of damage for the user.

As can be seen from the drawing, the foil edge 34 is disposed between the flange 22 and the free outer edge of the rim portion 36 of the product holder 18, and is therefore, when viewed from the center of the packaging, disposed beyond the connecting seam 26. Accordingly, the connecting seam 26 is clearly spaced from an outer rim portion 46 of the edge 36 of the product holder 18. The sealing foil 16 can be any commercial composite or aluminum foil that permits heat sealing at the connecting seam 26 and in addition can easily be printed on.

Particularly advantageous as a sealing foil 16 is a laminated plastic-aluminum-composite foil having a 30μ thick aluminum layer and a 40μ thick polypropylene layer, whereby a polyethylene layer could also be used instead of a polypropylene layer. Such a foil has a very high resistance to tearing in the longitudinal direction; this is advantageous for the present application, and such a foil can easily be printed on. A coloration of the foil from below, which is desirable in view of the folded-over pull tab, can be effected via a pigmentation of the adhesive layer between the plastic and aluminum layers. The heat sealing, or possibly the adhesion, is effected between the plastic layer and the product holder.

In the further embodiment illustrated in FIG. 3, the product holder 18 is provided with two cross members 48 and 50 that extend over the entire height of the product holder and also extend in the transverse direction of the packaging, as can be seen from FIG. 4.

As a result of the members 48 and 50, the inner package is divided into three dish-shaped individual containers 52, 54, and 56 that are covered by a single sealing foil 16.

The connecting seam 26 also extends over the cross members 48 and 50, so that the individual containers 52, 54, and 56 are sealed-off relative to one another. However, on the cross members 48 and 50 the connecting seam is only 1.5 mm wide, whereas the circumferential portion of the connecting seam is 4 mm wide. In addition, by appropriate manufacturing measures, the adhesion of the connecting seam over the cross members 48 and 50 is reduced to such an extent that the foil 16 cannot tear at the cross members 48 and 50. This measure is necessary, since when the inner package is opened, no support at a flange 22 of the outer package occurs at the cross members 48 and 50.

By also providing a connecting seam at the cross members 48 and 50, it is possible to separately open the individual containers 52, 54, or 56, and to keep the flavor of the still-closed individual containers sealed in In this embodiment, the slope of the end walls 42 and 40 is somewhat greater than in the embodiment of FIG. 2, so that the angle is approximately 15° relative to a vertical line. Each of the walls of the cross members 48 and 50 has the same slope. Furthermore, the radii at the corner regions 32 and 30 and at the opposite corner regions is greater. Furthermore, each of the individual containers 52, 54, and 56 is symmetrically embodied, so that the same radii are provided at the corner regions 58, 60, 62, and 64 of the cross members 48 and 50, as can be seen in FIG. 4.

In this embodiment of the present invention, the product holder 18 is formed of a deep-drawn composite foil. The inventive composite foil includes an aluminum core that is surrounded by plastic layers that are applied in a securely adhered manner to the aluminum foil by a conventional process.

In the present embodiment, the following layer construction is provided:

An upper inner layer 66 comprises a 60μ tough polyvinyl chloride. A core layer 68 comprises 45μ aluminum. A lower outer layer 70 comprises 25μ polyamide. Surprisingly, this composite foil can be drawn to a depth that is adequate for chocolates, namely approximately 18 mm, without breaking or tearing. The rheological properties of polyvinyl chloride help to canalize and equalize the stresses that occur in the core layer 68, so that the composite foil 72, which comprises the described layer construction, does not tear during deep drawing.

The method of the present invention is particularly adapted, and will be described subsequently.

A conventional deep-drawing tool comprising a male part and female piece is provided, with a press of the male part being surrounded by a hold-down device that acts upon a drawing tool. The edge of the rim portion 36 of the composite foil 72 is formed between the drawing tool and the hold-down device.

In this connection, the distance between the inner diameter of the drawing tool and the outer diameter of the press is greater than the thickness of the material of the composite foil in order to permit a free formation of the end walls 40 and 42. It is proposed pursuant to the present invention to use spacers between the hold-down device and the drawing tool. These spacers are introduced between the free outer edge of the rim portion 36 and the hold-down device, and have a thickness of about 1 mm. The spacers extend along the entire free outer edge of the rim portion 36, in other words in a circumferential manner about the product holder 18.

The effect of the spacers is based upon the fact that they reduce the pressure of the hold-down device. In particular, material flow is more readily possible in the region of the cross members 48 and 50, so that a deep drawing of the indicated order of magnitude is possible.

In so doing, it is possible pursuant to the present invention that barely perceptible longitudinal folds in the direction of material flow form at the outer edge of the rim portion 36, while longitudinal folds are also provided at the radii of the corner regions 58, 60, 62, and 64 of the cross members 48 and 50. It is particularly advantageous if this region is subjected to a relatively low hold-down device pressure, so that at that location the material flow can be effected in an advantageous manner. Small folds that occur at that location do not interfere with the overall attractive impression of the inner package, and at the same time contribute to stabilization. The maximum condition possible for continuous production is reached when the folds are bent over to the maximum extent permitted by the material thickness.

In one inventively conducted test, isopropyl alcohol was used as a lubricant, and was applied to the upper inner layer 66. Due to the relatively thin construction of the plastic layers that surround the core layer 68, the aluminum character of the product holder 18 is not adversely affected.

As a way of making a comparison, the composite foil was deep drawn in the reversed direction, i.e. with the PVC layer on the bottom. However, this configuration developed tears already at a drawing depth of 12 mm.

The product holder 18 can be provided with at least one separating insert for chocolates and located within the inner package 14.

The present invention is, of course, in no way restricted to the specific disclosure of the specification and drawings, but also encompasses any modifications within the scope of the appended claims.

What I claim is:

1. In packaging for food, especially food such as individual pieces of chocolate or candy that keep for only a limited time, said packaging comprising an inner package, which includes a product holder sealed by a foil, and an outer package that surrounds said inner package and is made of a stiffening material such as cardboard, the improvement wherein:

said outer package is provided, remote :rom a bottom thereof, with an inwardly directed flange that extends parallel to said sealing foil, whereby below said flange are disposed at least a rim portion of said product holder and an edge of said sealing foil, with a connecting seam being disposed between said sealing foil and said product holder at a distance from an outer edge of said rim portion of said product holder.

2. Packaging according to claim 1, in which said edge of said sealing foil rests freely upon said rim portion of said product holder.

3. Packaging according to claim 1, in which said flange of said outer package has a free, inwardly directed edge that extends around the plane of said packaging, with said connecting seam being disposed inside said free edge of said flange.

4. Packaging according to claim 1, in which said edge configuration of said inner and outer packages is provided at least on two oppositely disposed long sides of said packaging.

5. Packaging according to claim 1, which includes said sealing foil having two long sides interconnected by two narrow sides, and which includes on one of said narrow sides, a handgrip for tearing open said sealing foil, with said handgrip being integral with said sealing foil, especially in the form of a tab that is an extension of said sealing foil.

6. Packaging according to claim 5, in which said tear-open handgrip is bent upwardly over said sealing foil and extends partially below said flange of said outer package.

7. Packaging according to claim 5, which includes packaging basic shape having two large, oppositely disposed surface areas, one of which is covered by said sealing foil.

8. Packaging according to claim 1, the basic shape of which is selected from the group consisting of parallelepipedal, prismatic, totally cylindrical, and semi-cylindrical shapes.

9. Packaging according to claim 1, in which said sealing foil is made of metal, such as aluminum, and in particular is a composite foil.

10. Packaging according to claim 1, in which said product holder is made of a composite foil.

11. Packaging according to claim 1, in which said connecting seam comprises an airtight adhesive seam or weld.

12. Packaging according to claim 1, in which said product holder is provided with at least one separating insert for chocolates.

13. Packaging according to claim 1, in which said product holder comprises a composite foil that includes an aluminum layer and is deep drawn.

14. Packaging according to claim 13, in which opposite sides of said aluminum layer are each provided with plastic layers stressed different from each other, with that plastic layer that is more greatly stressed during deep-drawing, in particular the upper inner layer, being made of a flow deformable plastic such as tough PVC, and with that plastic layer that is less greatly stressed during deep-drawing, in particular the lower outer layer, being made of a resiliently tough plastic such as polyamide.

15. Packaging according to claim 14, in which said polyamide layer is thinner than said aluminum layer, and said aluminum layer is thinner than said PVC layer.

16. Packaging according to claim 13, which includes cross member means for subdividing said product holder, whereby remote from a bottom of said product holder, said cross member means is considerably narrower than said circumferential edge of said product holder.

17. Packaging according to claim 13, in which end regions of said cross member means terminate in curved sections that diverge from said cross member means, so that dish-shaped recessed areas are formed; and in which in the transition areas between said cross member means and said curved sections thereof, folds extending in the direction of drawing are formed.

18. Packaging according to claim 13, in which said product holder is provided with an upper inner layer of a heat-sealable plastic foil such as tough PVC.

19. Packaging according to claim 1, which includes cross members in said product holder, formed so that said cross members have side walls commensurate with height as said packaging with said side walls merging with side walls of said product holder, and with a respective dish-shaped container being formed on each side of a cross member.

20. Packaging according to claim 1, which includes locations of relatively low drawing stress leading said foil and in particular being contacted by spacers that reduce hold-down pressure at locations of great bending stress.

21. Packaging according to claim 9, which includes a lubricant, applied to an upper layer of said composite foil.

22. Packaging according to claim 9, which includes a predetermined size of the radius of curvature of curved corners between side walls of said product holder formed by, with a given composite foil, reducing said radii until longitudinal folds develop that extend in the direction of said curved corners.

23. Packaging according to claim 21, in which said lubricant is isopropyl alcohol.

24. Packaging according to claim 9, which includes a predetermined size of the radius of curvature of curved corners between side walls of said product holder formed by, with a given composite foil, increasing the height of said side walls until longitudinal folds develop that extend in the direction of said curved corners.

* * * * *